United States Patent [19]

Cenegy et al.

[11] Patent Number: 4,941,917

[45] Date of Patent: Jul. 17, 1990

[54] PROCESS FOR RECOVERY OF PRECIOUS METALS FROM CARBONACEOUS ORES USING CHLORINE DIOXIDE

[75] Inventors: Lawrence M. Cenegy, Spring, Tex.; Samuel G. Deal, Salt Lake City; Max E. Cooley, Tooele, both of Utah; Paul B. Clark, Evanston, Wyo.

[73] Assignees: Exxon Chemical Patents Inc.,, Linden, N.J.; Barrick (USA) Inc., ; a part interest

[21] Appl. No.: 358,957

[22] Filed: May 30, 1989

[51] Int. Cl.$^5$ .............................................. C22B 11/04
[52] U.S. Cl. ........................................ 75/744; 423/27; 423/29; 423/30; 423/31; 423/38; 423/46
[58] Field of Search ..................... 75/118 R, 105, 114, 75/101 R; 423/27, 29, 30, 31, 38, 46

[56] References Cited

U.S. PATENT DOCUMENTS 4,289,532  9/1981  Matson et al. ......................... 75/105
4,629,502  12/1986  Sherman et al. .................. 75/118 R

*Primary Examiner*—Robert L. Stoll
*Attorney, Agent, or Firm*—R. L. Graham; J. F. Hunt

[57] ABSTRACT

Carbonaceous ore containing a precious metal (gold) is treated with an aqueous solution of chlorine dioxide to enhance the recovery of the precious metal.

17 Claims, No Drawings

PROCESS FOR RECOVERY OF PRECIOUS METALS FROM CARBONACEOUS ORES USING CHLORINE DIOXIDE

FIELD OF THE INVENTION

This invention relates to the use of chlorine dioxide to promote the recovery of gold, silver and other precious metals from carbonaceous ores. In one aspect, the invention relates to the use of stabilized chlorine dioxide solutions to promote the recovery of precious metals, gold in particular, from carbonaceous ores.

BACKGROUND OF THE INVENTION

It is common practice in the processing of gold ores to use high pH cyanide solutions to dissolve the gold from the parent ore. This dissolution process forms a gold-cyanide complex. It is known that the presence of carbon, especially organic carbon, can greatly hinder the recovery of the precious metal from the ore.

Carbonaceous ore typically contains between 0.01 and 1.0 oz./ton of gold, usually associated with silver, and 0.25%-3% organic carbon by weight. The organic carbon is believed to impede the recovery of the precious metal by one or both of the following mechanisms:

1. The carbon in the ore absorbs or adsorbs the gold-cyanide complex formed by the dissolution of the gold by the alkaline cyanide solution. This renders the gold non-recoverable. In the absence of carbon in the ore, the gold complex would normally be recovered by any one of several processes and the gold later separated from the complex.
2. The gold is believed to be intimately associated with the carbon in the ore. The gold is either adsorbed on active carbon elements and/or associated as organometallic or other organic chelate compounds which are not amenable to conventional cyanidation. Smaller portions of the total gold content may be present as clay-like mineral matrix.

Regardless of the predominate mechanism involved, it is common practice to pretreat carbonaceous ore containing precious metals with an oxidizing agent to destroy or reduce the effects of the carbon.

Over the years a variety of oxidizing agents have been proposed for the pretreatment of carbonaceous ores. These prior art techniques involved the use of ozone (U.S. Pat. No. 3,574,600), alkaline hypochlorite (U.S. Pat. No. 3,639,925), chlorine gas (U.S. Pat. No. 4,038,362), and oxygen (4,289,532).

SUMMARY OF THE PRESENT INVENTION

Broadly, the method of the present invention comprises the treatment of an aqueous slurry of carbonaceous ore with an effective amount of chlorine dioxide to react with the carbon and convert it to a form that does not impede or interfere with the subsequent gold extraction steps.

In a preferred embodiment of the invention, the carbonaceous ore is treated with an aqueous solution of chlorine dioxide.

In the most preferred embodiment of the invention, the chlorine dioxide treatment is controlled to form a gold chloride compound soluble in the aqueous liquid of the slurry, making it amenable to gold recovery without subsequent cyanidation.

In still another embodiment of the invention, the oxidized ore slurry may be processed through the gold leaching steps using conventional cyanidation and post treatment processes.

While chlorine dioxide may be provided by a variety of sources including aqueous solutions of chlorine dioxide and the on sight generation of chlorine dioxide, the preferred source is stabilized aqueous solutions of chlorine dioxide. The aqueous solution regardless of source should contain at least 1000 ppm chlorine dioxide and may contain up to its saturation limit (e.g. 4000 ppm at 20° C., and 37.5 mm Hg pressure). With stabilized chlorine dioxide, the chemicals for maintaining chlorine dioxide levels in the solution may be present in amounts greater than 4000 ppm.

DESCRIPTION OF THE PREFERRED EMBODIMENTS

The present invention will be described in connection with the pretreatment of carbonaceous gold bearing ores that are subjected to subsequent gold extraction processes. It, however, will be appreciated by those skilled in the art that the method may be employed with other carbonaceous ores containing other precious metals, especially silver.

As mentioned above, carbonaceous ores are those that contain carbonaceous impurities, generally in the range of 0.25-3.0 wt % of organic carbon and from 2.0-5.0 wt % of total carbon with selected portions of the ore containing as much as 12% total carbon. Although there are numerous variations of processing gold containing ore, the present invention will be described with reference to three relevant steps: (1) preparing an aqueous slurry of the ore, (2) oxidizing the ore and, (3) extracting the gold from the oxidized ore.

Prior to the pretreatment operation, the ore is processed into a slurry be conventional methods and techniques. This may involve crushing, wet grinding, cycloning, or combinations of these to reduce the ore to finely divided particles. The particles typically are finer that about 30 mesh and coarser than about 200 mesh. When ore tailings are treated, the particles may be as fine as 400 mesh or even finer.

A slurry of the particles in water is formed and processed through an oxidizing step. Although the concentration of the ore particles is not critical, the slurry will normally comprise from 20 to 60 wt % solids. The oxidizing step may be carried out in a tank or container equipped with agitation means. The slurry as fed into the tank will normally have a pH above about 6.0 and not greater than about 9.0.

The aqueous solution of chlorine dioxide is added to the tank and contents are stirred or agitated to ensure thorough dispersion and contact with the ore. The amount of preconditioning and agitation will depend on several factors but from 30 minutes to 3 hours should be satisfactory for most applications. The pH is then adjusted to less than 6.0 by the addition of a mineral acid such as HCl (10 to 20 wt % aqueous solutions), with continued stirring. The final adjusted pH is preferably in the range of 2.0 to 5.0 and, most preferably in the range of 2.5 to 3.5. Reactions at pH's above 5.0 and below 2.0 appear to be too slow for optimum best operation.

The pH may be adjusted prior to introducing the chlorine dioxide into the oxidizing tank, but the above procedure of preconditioning the ore prior to pH adjustment is preferred because it appears to give better control of the reaction and produce better results.

As indicated above, the aqueous solution of chlorine dioxide may be obtained from different sources. As is known, chlorine dioxide is an unstable, highly reactive gas which is soluble in and decomposes in water. Because of its instability, it is common for chlorine dioxide to be generated as an aqueous solution at the point of use and used immediately. Several methods of on site preparation of chlorine dioxide are described, as, for example, in U.S. Pat. Nos. 4,077,879, 4,247,531, and 4,590,057, all of which are incorporated herein by reference.

The generated chlorine dioxide can be introduced and dissolved in the aqueous slurry in the oxidizing tank or an aqueous solution thereof may be prepared and added to the oxidizing tank. Preferably, however, the chlorine dioxide is added in the form of stabilized chlorine dioxide solution. "Stabilized chlorine dioxide" is a compound which dissociates and tends to maintain the available chlorine dioxide in the aqueous solution at a fixed level.

Sufficient chlorine dioxide is used to react with the carbon and organo metallic compounds in the ore. It is preferred that at least 50 wt % of the organic carbon is destroyed by reaction with chlorine dioxide. The optimum amount of chlorine dioxide will depend on several factors including the type of ore, the form and strength of the chlorine dioxide, residence time, etc. For most applications, 5 to 100 pounds of chlorine dioxide per ton of ore will be sufficient. When using a stabilized solution of chlorine dioxide, the treatment may be in the range of 25 to 500 pounds of the solution per ton of ore.

Although the reaction of the chlorine dioxide with the carbon or organometals is not fully understood, the following reactions are believed to occur at low pH:

(a) Reactions of chlorine dioxide and organic carbon:
The carbon compounds are believed to be similar in structure to humic acids such as those found in Leonardite. These humic acid extracts contain long chain carboxylic acids as well as sulfur and nitrogen groups. It is well known that the energy required to oxidize typical sulfur, nitrogen and carboxyl groups encountered in long chain organic materials is minimal. Hence, chemical oxidation such as chlorine dioxide can cause chain cleavage, oxidation of sulfur, nitrogen and carboxyl groups, and reaction at points of unsaturation.

(b) Reaction of chlorine dioxide and gold: It is believed that a substantial amount of the gold is locked up in the form of a chelate containing CO-N-S ligands. Disruption of these ligands causes the ionic gold to be freed and solubilized, most likely in the form of a chloride and/or chloride complex.

With the organic carbon oxidized, the slurry may be processed by conventional cyanidation and carbon-in leach processes. Alternatively, since the gold is present as ionic gold or soluble gold complex, the gold may be extracted by ion exchange or carbon adsorption processes. Thus, the solids as a highly concentrated slurry of the oxidized slurry is processed to recover elemental gold and the liquid of the oxidized slurry is processed to recover solubilized gold.

In practice, the chlorine dioxide oxidation process preferably will be carried out in a batch process although continuous process could be used. Oxidation in accordance with the present invention may be used in conjunction with other oxidizing steps such as oxygenation or chlorination as described in U.S. Pat. No. 4,289,532. Moreover, the chlorine dioxide formulation may include other reactants such as sodium chlorite. In fact, some stabilized chlorine dioxide products are sodium chlorite generated and may have sodium chlorite available for reaction with carbon.

In an alternate embodiment of the invention, the carbonaceous ore may be concentrated by separating at least part of the carbonaceous ore from the noncarbonaceous ore prior to the oxidation step. The concentration can be achieved by a flotation step in flotation cells. A flotation agent such as oil, alcohol, or glycol is brought into contact with the ore in the chamber and agitated with gas. The agent preferentially contacts the carbonaceous particles in presence of gas and causing them to float to the surface where they may be skimmed off as a carbonaceous ore concentrate. The noncarbonaceous ore will remain in the ore slurry and may be processed separately for gold extraction.

The separated carbonaceous ore is then subjected to the oxidation with chlorine dioxide as described previously. The concentrated carbonaceous ore will have substantially higher levels of organic carbon (e.g. 2 to 30 wt %) making the oxidation process more efficient. The concentrated ore may also have higher levels of gold in the order of 0.1 to 10 oz per ton of ore concentrate. In the ore concentration step, from about 1 to about 50 wt %, preferably 1 to 20 wt %, of the ore is removed as carbonaceous ore, with the balance being substantially noncarbonaceous ore. The concentrated carbonaceous ore is treated in accordance with the present invention and the noncarbonaceous ore may be treated for gold extraction as by conventional cyanidation.

In the best mode for practicing the invention, the precious metal ore will be slurried as finely divided particles in water and subjected to the following steps: (a) flotation to concentrate the carbonaceous ore, (b) oxidation with aqueous solution of stabilized chlorine dioxide, and (c) gold extraction by reduction and adsorption or ion exchange on exchange resins.

The ore particles (e.g. 30 to 200 mesh) are first floated in one or more float cells using a flotation aid at a ratio of 0.05 to 5 pounds per ton of ore treated. About 1 to 10 wt % of the ore is separated as carbonaceous ore and subjected to the oxidation and gold extraction steps.

The floated concentrate is introduced as batches into a tank or a series of tanks provided with stirrers and heating facilities. Stabilized chlorine dioxide such as DIKLOR marketed by Exxon Chemical Company is introduced into the tank and stirred for about 1/2 to 2 hours. About 25-500 pounds of the DIKLOR is used per ton of carbonaceous ore. The pH is slowly reduced to between 2.5 to 3.5 by the addition of aqueous HCl, and the temperature increased slightly to promote the reaction. A reaction time of 0.5 to 3 hours should be sufficient to complete the reaction.

Following the reaction of the chlorine dioxide in the tank, the liquid containing gold chloride complex solubilized therein is withdrawn and processed by known techniques for separating gold from solutions such as ion exchange processes or carbon reduction and adsorption processes. For example, the gold complex solution may be passed through ion exchange resin bed wherein the gold is collected on the resin. Gold collected on the ion exchange resin is then chemically eluted by chemicals such as mineral acid (e.g. HCl) or thiourea. In the case of carbon adsorption, the gold complex solution is treated with carbon to adsorb the gold which is then stripped from the carbon using alkaline solutions (e.g. NaOH and sodium cyanide).

The solids of the oxidized slurry may be combined with the noncarbonaceous ore and treated with cyanide to form cyanide-gold complex, which then may be treated as described in U.S. Pat. No. 4,289,532 to extract any gold remaining therein.

EXAMPLES

Flotation ore concentrate samples from a system were used in the experiments. The ore concentrate contained the following (all percentages expressed as wt %).

| | |
|---|---|
| Head grade (total gold) | 0.700 oz/ton |
| Total carbon | 5.63% |
| Organic carbon | 3.51% |
| Sulfur | 1.68% |
| Sulfate | 1.51% |
| Sulfide | 0.17% |

A 100 gram sample of the dried ore was mixed with 300 ml of water. The oxidizer was added and agitated for one hour. Additional additives (i.e. pH adjustments) were added and the temperature increased to 60° C. over 15 to 20 minutes. The slurry was stirred for three hours. The reagents used were Oxidizer: stabilized chlorine dioxide (DIKLOR) or sodium hypochlorite (prior art)
pH Control:
   sodium hydroxide
   aqueous hydrochloric acid (15%)
   sodium bicarbonate A specific exothermic reaction occurs. During this reaction, the temperature of the slurry increased on the average 20 to 30 degrees C. The duration of the reaction varied from a violent, boiling reaction lasting 30 seconds or less, to a quiet, effervescent type reaction lasting over 30 minutes. A slower, controlled reaction appears to release more gold into solution and to accompany a greater destruction of the organic carbon than does a faster, more vigorous reaction.

The reaction appears to be very pH dependent. With the addition of the hypochlorite, the pH of the slurry increases to about 12.0 and drops rapidly upon heating the slurry. No reaction appears to occurs until the pH drops below 7.5. The pH settles at about 6.7 to 8.0 when the reaction is complete.

With chlorine dioxide as the oxidizer, no reaction was apparent until the pH was adjusted to about 3.0. However, it is believed that the workable pH range of 2.0 to less than 6.0, especially 2.0–5.0, by adjusting operating temperatures, residence time, etc.

Following the reaction of each test, the amount of gold in solution was analytically determined.

The completeness of the reaction in terms of percent gold recovered, appears to be enhanced by a conditioning period of at least 30 minutes to an hour with the oxidizer.

The length of time from the start of heating to the start of the reaction varies from 20 minutes to over 3 hours depending on the particular reagents used and the temperature to which the slurry is heated. Best results have been observed when conditions are such to produce a reaction time of about 90 minutes. The optimum temperature appears to be between 50 and 60 degrees C.

The results of the tests are presented in Table I. It should be noted that the solids following the oxidation step in Experiment No. 1 contained 0.064 oz gold per ton of ore. These solids were subjected to cyanidation and carbon in leach process. The final solids contained only 0.018 oz gold per ton of ore. Corresponding levels of gold after oxidation and after cyanidation are presented for Experiments 2 through 5. The percent of gold recovered in all tests is based on the total gold beginning—total gold remaining.

TABLE I

| | EXPERIMENTS | | | | | |
|---|---|---|---|---|---|---|
| REAGENT | No. 1 | No. 2 | No. 3 | No. 4 | No. 5 | No. 6 |
| Oxidizer | $ClO_2^1$ | $NaOCl^2$ | NaOCl | NaOCl | NaOCl | None |
| Amnt. (ml) | 25 | 250 | 150 | 100 | 50 | |
| Float Conc. (Dry grams) | 100 | 100 | 100 | 100 | 100 | 100 |
| HCl (ml) | 125 | None | None | None | None | None |
| pH Start | 7.2 | 7.2 | 7.2 | 7.2 | 7.2 | 7.2 |
| pH Adjusted | 2.5 | 12.3 | 11.8 | 11.3 | 10.8 | — |
| pH Final | 7.5 | 6.6 | 6.6 | 6.8 | 7.5 | — |
| Gold oz/ton | | | | | | |
| Solids Washed | 0.064 | 0.236 | 0.254 | 0.400 | 0.522 | |
| Solids Post CIL | 0.018 | 0.136 | 0.134 | 0.234 | 0.424 | 0.602 |
| % Au RECOVERY | 97.4% | 80.6% | 80.9% | 66.6% | 39.4% | 14.0 |
| Total Carbon | 3.36 | 4.69 | 4.76 | 5.07 | 5.33 | 5.63 |
| Organic Carbon | 0.50 | 2.12 | 2.17 | 2.70 | 3.08 | 3.51 |
| % TC DESTROYED | 40.3% | 16.8% | 15.5% | 10.0% | 5.3% | 0 |
| % OC DESTROYED | 85.8% | 39.6% | 38.2% | 23.1% | 12.3% | 0 |
| Sulfur S | 0.161 | 0.309 | 0.368 | 0.661 | 0.886 | 1.68 |
| Sulfur $SO_4$ | 0.110 | 0.180 | 0.240 | 0.480 | 0.690 | 1.51 |
| Sulfide S | 0.051 | 0.129 | 0.128 | 0.181 | 0.196 | 0.17 |

[1]$ClO_2$ - stabilized aqueous solution of chlorine dioxide sold by Exxon Chemical Company.
[2]NaOCl - 15% aqueous solution The above data demonstrate dramatic effect of chlorine dioxide on the recovery of gold. The stabilized chlorine dioxide destroyed more than 40% of the total carbon and more than 85% of the organic carbon which was twice the effectiveness of NaOCl.

While the method of the present invention has been described with specific reference to gold ore, it will be appreciated by those skilled in the art that the principles thereof may be employed in the treatment of any precious metal ore where is desirable to destroy organic carbon.

What is claimed is:

1. A method of treating a carbonaceous ore containing precious metals to destroy or oxidize carbon, said method comprising
    (a) forming an aqueous slurry of said ore;
    (b) adjusting the pH of said slurry to below about 6; and
    (c) treating the slurry with an effective amount of an aqueous solution of chlorine dioxide to destroy or react with at least 50 wt % of organic carbon in the ore.

2. The method of claim 1 wherein the aqueous solution of chlorine dioxide is added to the ore slurry prior to pH adjustment.

3. The method of claim 2 wherein the ore contains gold and wherein the treatment with the aqueous solution of chlorine dioxide solubilizes at least a portion of the gold in the liquid of the slurry.

4. The method of claim 3 and further comprising the step of separating gold from the liquid of the slurry.

5. The method of claim 3 wherein the concentration of the chlorine dioxide in the aqueous solution is at least 1000 ppm.

6. The method of claim 3 wherein the chlorine dioxide is stabilized chlorine dioxide.

7. The method of claim 3 and further comprising the step of extracting gold from the oxidized slurry.

8. The method of claim 3 wherein the slurry is treated with between about 5 to about 100 pounds of chlorine dioxide per ton of ore in the slurry.

9. The method of claim 1 wherein the carbonaceous ore contains gold, a portion at least of which is present as a gold chelate and wherein the chlorine dioxide in the treatment step reacts with the gold chelate to from gold chloride or gold chloride complex soluble in the aqueous liquid of the slurry; and wherein the extracting step comprises treating the gold chloride or gold chloride complex with means to separate the gold from solution.

10. The method of claim 2 wherein the ore slurry and aqueous solution of chlorine dioxide are maintained in contact for at least thirty minutes prior to adjusting the pH.

11. The method of claim 1 wherein the step (c) is carried out under conditions to substantially complete the reaction of chlorine dioxide with carbon present in the ore.

12. The method of claim 10 wherein the pH adjusting step and the treating step are carried out as a batch process in a tank.

13. A method of destroying organic carbon in carbonaceous ore containing gold which comprises
    (a) forming a slurry of ore particles in an aqueous liquid;
    (b) adding aqueous solution of chlorine dioxide to the slurry,
    (c) lowering the pH of the aqueous slurry containing the chlorine dioxide until the reaction of chlorine dioxide with carbon is promoted; and
    (d) permitting the reaction to proceed until the at least 50 wt % of the organic carbon in the ore slurry is oxidized or destroyed.

14. The method of claim 13 wherein the aqueous chlorine dioxide is stabilized chlorine dioxide and is added at a rate sufficient to generate from 5 to 100 pounds of chlorine dioxide per ton of ore in the slurry.

15. A process for recovering gold from a carbonaceous ore containing chelated gold comprising
    (a) forming an aqueous slurry of the ore;
    (b) treating the ore in the slurry with an aqueous solution of chlorine dioxide to convert a portion at least of the chelated gold to gold chloride or gold chloride complex soluble in the aqueous liquid of the slurry; and
    (c) recovering gold from the soluble gold chloride or gold chloride complex solution.

16. A method of recovery precious metal from carbonaceous ore which comprises
    (a) forming a slurry of the ore in water;
    (b) separating the ore into carbonaceous ore slurry and a noncarbonaceous ore slurry;
    (c) oxidizing the carbonaceous ore slurry by
        (i) adding sufficient chlorine dioxide to the carbonaceous ore to destroy at least 50 wt % of the carbon therein, and
        (ii) reducing the pH of carbonaceous ore slurry to a level between 2 to 5 to cause the chlorine dioxide to react with the carbon; and
    (d) recovering gold from the oxidized ore slurry.

17. The method of claim 16 wherein step (d) comprises recovering soluble gold from the liquid of the slurry and recovering elemental gold from the solids of the slurry.

* * * * *